United States Patent
Shiau et al.

(10) Patent No.: US 11,146,631 B1
(45) Date of Patent: Oct. 12, 2021

(54) METHOD FOR DEPLOYING COMPUTER OPERATING ENVIRONMENT AND DEPLOYMENT SYSTEM

(71) Applicant: National Applied Research Laboratories, Taipei (TW)

(72) Inventors: Jr-Huang Shiau, Hsinchu (TW); Chen-Kai Sun, Hsinchu (TW); Yu-Chin Tsai, Hsinchu (TW); Yu-Chiang Huang, Hsinchu (TW); Ching-Hsuan Yen, Hsinchu (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 0 days.

(21) Appl. No.: 17/106,344

(22) Filed: Nov. 30, 2020

(30) Foreign Application Priority Data

Aug. 12, 2020 (TW) .................................. 109127389

(51) Int. Cl.
*H04L 29/08* (2006.01)
*G06F 9/4401* (2018.01)
*H04L 29/12* (2006.01)
*G06F 21/64* (2013.01)

(52) U.S. Cl.
CPC .......... *H04L 67/108* (2013.01); *G06F 9/4416* (2013.01); *G06F 21/64* (2013.01); *H04L 61/2015* (2013.01); *H04L 67/1091* (2013.01)

(58) Field of Classification Search
CPC ............... H04L 67/108; H04L 67/1091; H04L 61/2015; G06F 9/4416; G06F 21/64
See application file for complete search history.

(56) References Cited

U.S. PATENT DOCUMENTS

| | | | | |
|---|---|---|---|---|
| 10,664,574 | B1* | 5/2020 | Powers | ............... G06F 21/6218 |
| 2006/0212517 | A1* | 9/2006 | Rohall | .................... G06F 9/547 |
| | | | | 709/205 |
| 2012/0265822 | A1* | 10/2012 | Wang | .................... H04L 67/104 |
| | | | | 709/204 |

FOREIGN PATENT DOCUMENTS

| | | |
|---|---|---|
| CN | 102193817 A | 9/2011 |
| TW | 201624965 A | 7/2016 |
| WO | 2011100799 A1 | 8/2011 |

* cited by examiner

*Primary Examiner* — Azizul Choudhury
(74) *Attorney, Agent, or Firm* — Li & Cai Intellectual Property (USA) Office (57) ABSTRACT

A method for deploying a computer operating environment and a deployment system are provided. A template machine is provided. A deployment program is executed in the template machine for scanning data of an operating system and applications in the template machine. The data are segmented into multiple segments and then encoded. An index and a checksum for each of the segments called metainfo are created. The metainfo is distributed to terminal machines within a network domain. After receiving the metainfo, every terminal machine obtains the segments, decodes the segments, and verifies the correctness of the received segments with the checksum. When requested by other terminal machines, the terminal machine reads the specific segments and then distributes those to the other terminal machines via a peer-to-peer data sharing protocol. The deployment is completed after all of the segments of operating environment are written in the terminal machine.

16 Claims, 6 Drawing Sheets

METHOD FOR DEPLOYING COMPUTER OPERATING ENVIRONMENT AND DEPLOYMENT SYSTEM

CROSS-REFERENCE TO RELATED PATENT APPLICATION

This application claims the benefit of priority to Taiwan Patent Application No. 109127389, filed on Aug. 12, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is related to a technology for deploying a computer operating environment, and more particularly to a method for deploying operating environment on multiple computer systems using peer-to-peer data distributing technology and a system.

BACKGROUND OF THE DISCLOSURE

A computer device may need to spend some time to install a full operating system and software programs. If there are a number of computer devices that require installing the operating system and software programs, in addition to spending a lot of time to do the installations, some conventional approaches are provided for massive deployment.

In the conventional technologies, when conducting massive deployment, one of the approaches is to provide a template machine which has installed a standard operating environment including an operating system and requisite software programs. A specific software program is used to create an image file that contains the operating environment of the template machine. This image file is then applied to every target device by the software program, and the operating environment and the operating system in the image file are deployed to the target device.

In one further conventional technology, a centralized server is prepared for storing backup files including an operating program and requisite programs. The backup files can also be an image file. Other target hosts requiring to install the operating environment can be booted up via network and connect to the server. The target hosts then download an installation program for receiving the operating program and software programs. Finally, a centralized deployment to the target hosts is completed.

SUMMARY OF THE DISCLOSURE

The disclosure is related to a method for deploying a computer operating environment and a deployment system. The deployment system includes multiple terminal machines that are ready to process deployment operations. One of the terminal machines or an additional one machine acts as a template machine that includes an operating environment configured to be deployed to the terminal machines. The operating environment includes an operating system, one or more applications, and data. In an aspect of the disclosure, an external bootable storage device plugged to the template machine is provided to initiate the template machine. The bootable storage device stores a software program that is developed by a mechanism to perform the method of the disclosure.

After the template machine is initiated, a deployment program is executed to scan a file system of an internal storage device of the template machine. The data relating to the operating environment in the hard drive is segmented and encoded so as to form multiple segments. Indexes and segment checksums with respect to the segments are also created. For achieving a peer-to-peer (P2P) data sharing protocol such as a BitTorrent (BT) method, a metainfo file or a metadata file for the above data is created. The size of BitTorrent-related metainfo file and file system partition data generated in the template machine may be only hundreds of kilobytes to several megabytes that can be temporarily stored in a memory without preparing additional storage space. The data can also be stored in any other memory space.

The system performs the method for deploying a computer operating environment via the template machine.

In the template machine, a deployment program is executed so as to distribute the segments to the terminal machines in a network domain. In any of the terminal machines, an operating environment duplicate program is executed for receiving the segments. After decoding the segments and verifying the correctness of the received segments with checksums, the verified segments are written to a storage device of the terminal machine and they can be again distributed to other terminal machines in the network domain via the peer-to-peer data sharing protocol.

Each of the terminal machines receives the multiple segments from the template machine and other terminal machines via the peer-to-peer data sharing protocol. After decoding and verification are completed, the multiple segments are written to the storage device of the terminal machine according to the indexes of the segments and the deployment is completed.

In one of the aspects, the deployment program is installed in a specific storage device of the template machine. This specific storage device includes a bootable operating system, a server program and the deployment program. The specific storage device initiates the template machine that operates a dynamic host configuration protocol (DHCP) server that serves the terminal machines to operate over the network. The specific storage device can be an external storage device of the template machine.

Further, when the template machine is initiated, a deployment tracker is operated in the template machine for tracking a deployment progress of every terminal machine in the network domain. Thus, when the terminal machine is deployed with the operating environment, a message indicating that the deployment has been completed is transmitted to the deployment tracker.

Preferably, the peer-to-peer data sharing protocol provided for the terminal machine to transmit data can be a BitTorrent data transmission protocol that is implemented among the terminal machines in the network domain.

Further, one or more steps to be performed have been written in an external storage device and are provided for the template machine to perform automatically when the template machine boots up. A deployment host is therefore implemented so as to allow the multiple terminal machines to be booted via network and receive commands provided by the template machine automatically.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to a method for deploying a computer operating environment and a deployment system. The method is a solution that is applicable to a massive deployment. The difference between the conventional technology and the method for deploying a computer operating environment of the disclosure is that the disclosed method neither makes any image file in the process nor uses any external storage for storing the image file. In the method, a peer-to-peer data sharing protocol is used for distributing data to terminal devices in a network domain. The peer-to-peer data sharing protocol is such as a BitTorrent protocol. Further, the data of a file system of an internal storage device of a template machine can be read and distributed to other terminal machines via the protocol. When any of the terminal devices receives the data, the data may be re-distributed to other terminal machines via the same technology, e.g., via the BitTorrent protocol. The method of the disclosure can effectively improve the massive deployment of operating environment.

The method for deploying a computer operating environment is applicable to circumstances that require massive deployment with an operating system and software applications, such as a computer classroom, a cluster computer system and an office. According to one of the embodiments, a storage device installed with a bootable operating system is provided. The storage device can be an external storage device such as a USB disk drive or a CD-ROM that is connected to a template machine. The template machine can be booted via this storage device. A deployment program is executed in the template machine when the template machine is booted. The deployment program is used to deploy seed files that are created from the operating system and/or the software applications installed in the template machine to the terminal machines. The seed file packages up the data of each of the segments, the encoded data, index and checksum (i.e., metainfo) with respect to the segment regarding to the operating system and/or the software applications in the template machine. A specific program that achieves the peer-to-peer data sharing protocol executed in the terminal machine can be used to receive the seed files and conduct deployment until it is completed automatically.

Figure 1:
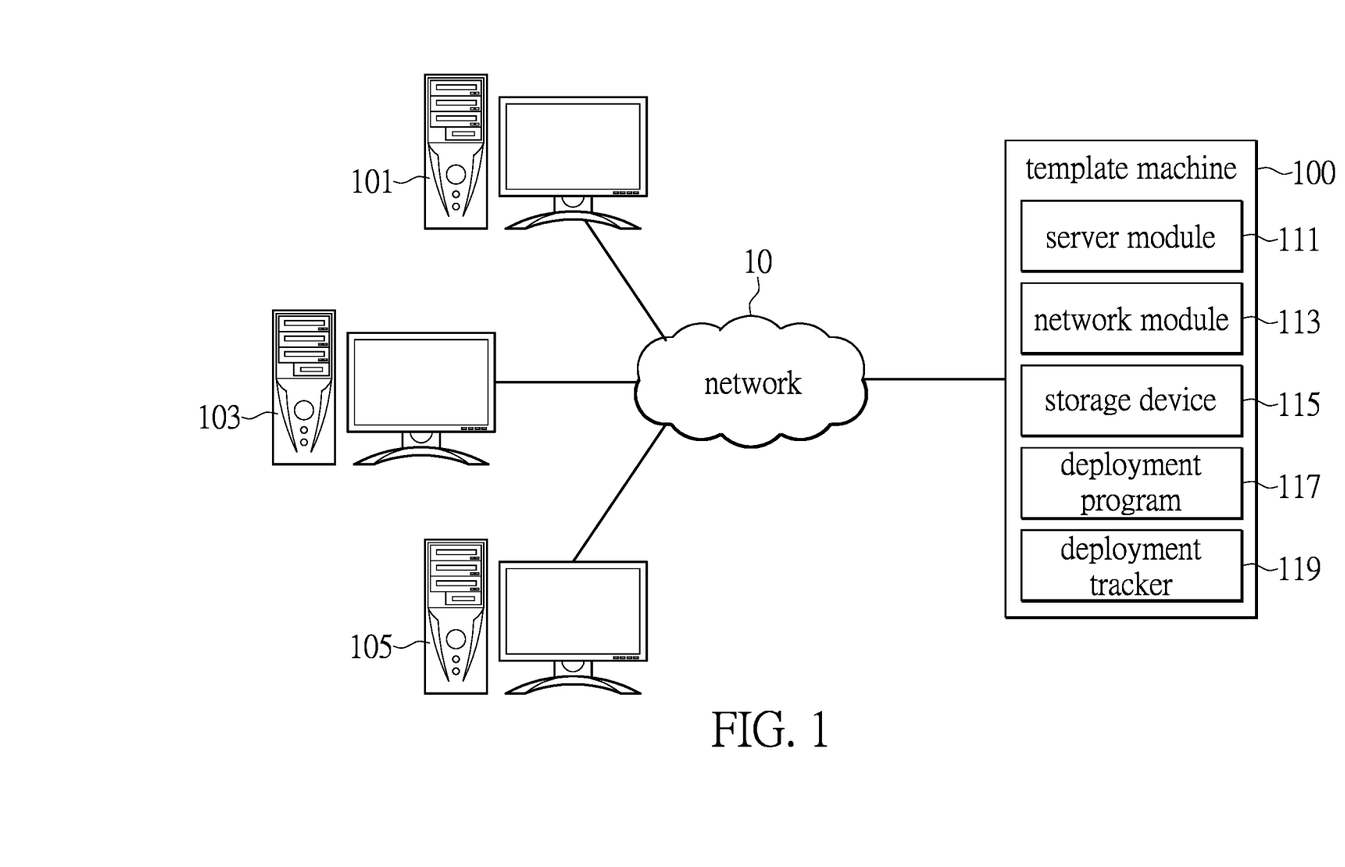
FIG. 1 is a schematic diagram depicting a framework for deploying a computer operating environment in one embodiment of the disclosure.

Reference is made to FIG. 1, which shows a schematic diagram depicting a framework of the deployment system according to one embodiment of the disclosure. The network-based deployment system covers a plurality of terminal machines 101, 103 and 105. The terminal machine 101, 103 or 105 can be a computer device that connects to a template machine 100 via a network 10. In one of the embodiments, one of the terminal machines can be selected to act as the template machine 100. An operating environment ready to be deployed to other terminal machines can be configured to be installed in the template machine 100. The operating environment means an operating system and/or software applications. A deployment program executed in the template machine 100 is used to deploy the operating environment to the terminal machines 101, 103, 105 in the same network domain.

In the template machine 100, a storage device 115 is provided. In the one of the embodiments, the storage device 115 can be an internal or an external storage device of the template machine 100. With the internal storage device as an example, the internal storage can be installed with a bootable operating system and software applications. In an exemplary example, the template machine 100 can be a personal computer, and the storage device 115 can be a built-in hard disk of the personal computer. Alternatively, the storage device 115 of the template machine 100 can also be an external boot media such as a USB drive or a CD-ROM that is connected to the personal computer via USB.

After the template machine 100 is initiated through the storage device 115 that acts as the external boot media, an operating system installed in the external boot media is loaded. Further, a deployment program is executed in the template machine 100 for enabling the template machine 100 as a deployment host. In the method for deploying a computer operating environment, the deployment program executed in the external boot media segments the operating environment including the operating system and software applications installed in the internal storage device of the template machine 100 into segments and encodes the segments. Indexes and checksums with respect to the segments are also created. After that, the data are encoded as the metainfo that is temporarily stored in a memory of the template machine 100. The data including the metainfo can be used as the seed file that is configured to be deployed to other terminal machines 101, 103, 105.

It should be noted that the operating system inside the storage device 115 is neither used to initiate the operating environment of the template machine 100 nor used to be deployed to the terminal machines 101, 103, 105; on the contrary, the operating environment deployed to the terminal machines 101, 103, 105 is loaded to the template machine 100 via an external storage device. After the operating system inside the external storage device of the storage device 115 is used to initiate the template machine 100, the template machine 100 can operate as a deployment host or as one or more servers, e.g., the server module 111 shown in the figure. The server module 111 can be a server that operates with a dynamic host configuration protocol (DHCP), so as to serve the terminal machines 101, 103, 105 in the network domain. For example, the DHCP server can assign network addresses to the terminal machines 101, 103, 105 or assist the terminal machines 101, 103, 105 to connect with an external network device.

In one embodiment of the disclosure, an auto-execution file can be provided in the external storage device. In the auto-execution file, one or more steps to be performed in the external storage device are written. The template machine 100 performs the one or more recorded in the auto-execution file automatically when the template machine 100 boots up, so as to implement a deployment host that allows the multiple terminal machines 101, 103, 105 to be booted via the network 10 and receive commands provided by the template machine 100 automatically. In the present embodiment, the auto-execution file allows the template machine 100 to perform the one or more steps without any user's operation. The terminal machines 101, 103, 105 can automatically receive commands from the template machine 100 when it boots up via the network 10. Through the above-mentioned deployment mechanism, the process of deployment performed among the multiple terminal machines 101, 103, 105 in the whole network domain can be simplified to a process of booting. The template machine 100 is booted up by a booting device, and the terminal machines 101, 103, 105 can be booted up via the network; afterwards, the deployment is completed.

The template machine 100 is initiated by an operating system of an external storage device, and then the operating environment installed in the internal storage device of the template machine 100 is deployed to other terminal machines 101, 103, 105. The operating environment of each of the terminal machines 101, 103, 105 is a duplicate of the operating environment in the internal storage device of the template machine. In particular, the peer-to-peer data sharing protocol is used to distribute the operating system and files in the internal storage device of the template machine to the terminal machines 101, 103, 105.

The template machine 100 includes a network module 113 that is used to connect with the terminal machines 101, 103, 105 via the network 10. The template machine 100 can distribute the data, i.e., segments, to the terminal machines 101, 103, 105 and also receive data from the terminal machines 101, 103, 105 via the network module 113.

When initiating the template machine 100 by the operating system installed in the external storage device, a deployment program 117 therein is executed to operate a peer-to-peer data sharing protocol. In one embodiment of the disclosure, the deployment program 117 can be a host-side BitTorrent program executed in the template machine 100. The deployment program 117 is used to scan the operating environment installed in the internal storage device of the template machine 100. The scanned data are then segmented into segments. Indexes and checksums with respect to the segments are created so as to form the metainfo. The deployment system also includes a deployment tracker 119 that can be an additional deployment tracker or implemented by a software program executed in the template machine 100 or in a specific computer device. The deployment tracker 119 is used to process the deployment information sent from the terminal machines 101, 103, 105. The deployment tracker 119 can also manage the data distributed to the terminal machines 101, 103, 105 in the network domain. Therefore, the deployment tracker 119 can be used to confirm if deployment performed on any of the terminal machines 101, 103, 105 is completed.

When the deployment program 117 is executed in the template machine 100, the program scans the file system of the internal storage device of the template machine 100, especially scans the data in a whole hard drive so as to identify used blocks therein. The data in the used blocks are then segmented into segments, and encoded. Indexes and checksums with respect to the segments are created so as to form the metainfo. The deployment program 117 can segment and encode the used blocks (while excluding the unused blocks), so that the performance of deployment can be enhanced. A seed file that is produced from the segment, encoded data, index and checksum is provided for deployment and can be stored to a memory of the template machine 100 temporarily. The seed file contains the meta data to be deployed to the terminal machines 101, 103, 105.

Figure 2:
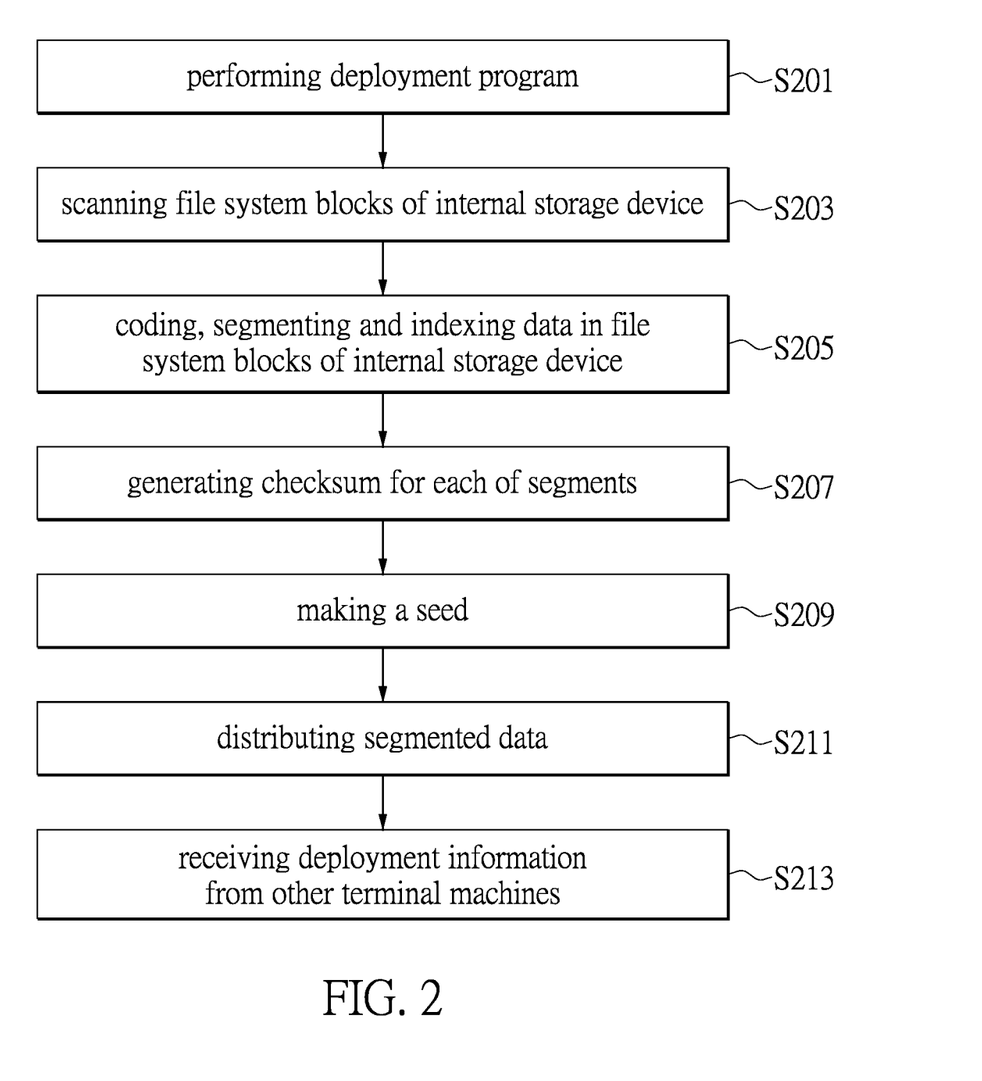
FIG. 2 shows a flow chart describing a method for deploying a computer operating environment in one embodiment of the disclosure.

FIG. 2 shows a flow chart describing a method for deploying a computer operating environment that is performed after initiating the template machine according to one embodiment of the disclosure.

In the deployment system, the template machine is initiated via the internal or external booting medium. A program developed in the present disclosure for deployment is also included in the booting medium. The template machine being initiated activates a networking function and servers, and also performs a deployment program (step S201). In an aspect of the disclosure, the deployment program refers to the various functional programs required by the deployment method. For example, the deployment program is used as a program to form the seed file in the template machine, a program to distribute data, and a program to receive data from the terminal machine. One of the functions of the deployment program is to scan the file system in the internal storage device of the template machine (step S203), encode the scanned data, segment the data into segments, and create indexes and checksums thereof (step S205).

For example, the deployment program can scan the file system sector by sector according to the specification of the file system of the internal storage device. An algorithm can be incorporated to encode the scanned data and segment them into segments. The data size, i.e., the length of data, of each of the segments can be regulated from kilobytes (KB) to megabytes (MB) based on practical requirement. In one embodiment, the size of the segment should be decided under the peer-to-peer data sharing protocol adopted by the system.

Next, for each of the segments, a checksum used to verify correctness of the segment is calculated (step S207). In one of the embodiments, the checksum can be calculated through a hash algorithm that is performed on each of the segments. A hash value obtained by the hash algorithm can be used as the checksum that allows the terminal machine which receives the segment to verify correctness of the segment through the same hash algorithm.

Thus, the deployment program executed in the template machine is used to segment the operating system and the applications into multiple segments, encode the segments, and create indexes and checksums with respect to the segments. Further, a metainfo is accordingly created from at least the indexes and checksums. Afterwards, a seed file used to be deployed to other terminal machines is formed (step S209). The seed file is then distributed to the terminal machines in the network domain with segments via a peer-to-peer data sharing protocol (step S211). In the meantime, the deployment program executed in the template machine waits for messages sent from the terminal machines after the segments are distributed, and can check the deployment progress through the messages (step S213).

Different from the conventional method for massive deployment that adopts a centralized host to deploy the operating environment, the method for deploying computer operating environment of the present disclosure essentially generates the segments in the template machine in order to distribute the segments to the terminal machines, so that the terminal machines can then transmit the segments with each other under the peer-to-peer data sharing protocol.

In one aspect of the disclosure, the peer-to-peer data sharing protocol is a BitTorrent data transmission protocol that is implemented among the terminal machines in the network domain. According to the BitTorrent data transmission protocol, a torrent server is initiated, especially operated in the template machine, within the network domain. In the deployment system, the data including the encoded segments, indexes and checksums (i.e., the metainfo) for the segments that comply with the BitTorrent data transmission protocol are formed in the torrent server. In one embodiment of the disclosure, the deployment system uses a deployment tracker to track the deployment progress for each of the terminal machines in the network domain. The deployment tracker can be a torrent tracker under the BitTorrent data transmission protocol. The torrent tracker can also be a sequence for functioning as the deployment tracker operated in a specific host or the template machine.

In one embodiment of the disclosure, when the template machine operating the deployment tracker is initiated, the deployment tracker is able to track the deployment progress of every terminal machine in the network domain. When the terminal machines transmit and receive the segments that are distributed under the peer-to-peer data sharing protocol, the deployment tracker can determine whether or not the deployment is completed according to the deployment information being transmitted by the terminal machines.

The template machine that installs a full operating environment can operate as a seeder operating under a peer-to-peer data sharing protocol. The seeder performs a process described in FIG. 2, and accordingly the terminal machine operates a corresponding process described in the flow chart of FIG. 3.

Figure 3:
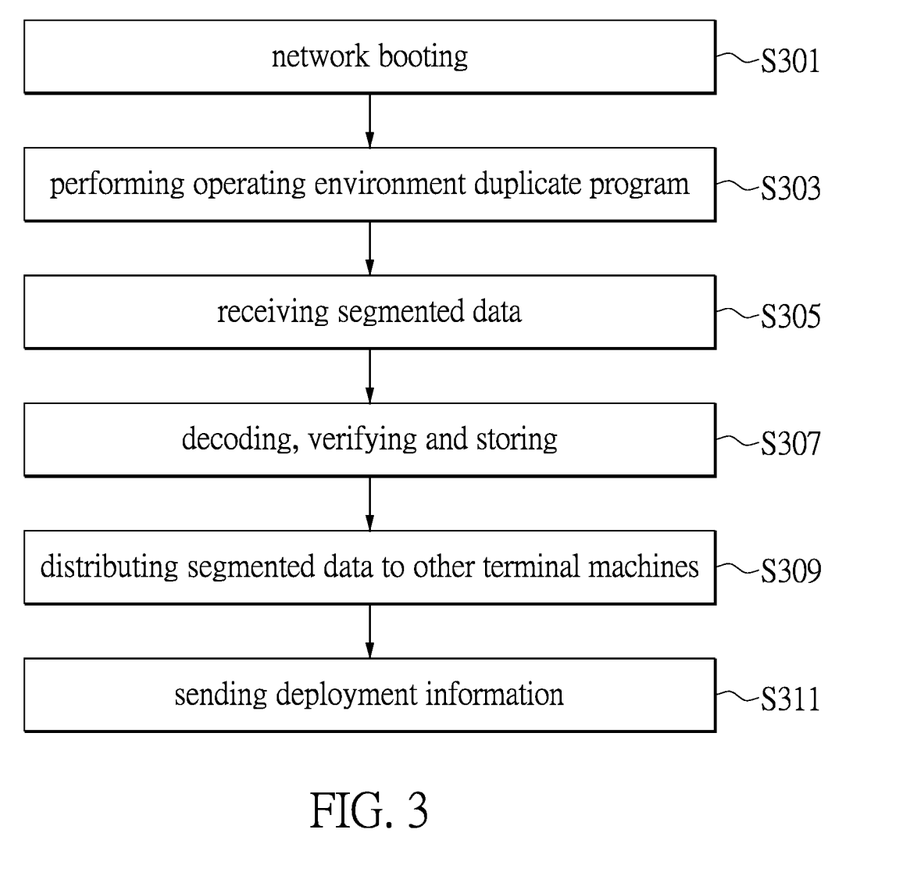
FIG. 3 shows another flow chart describing an operating process of a terminal machine in the method for deploying a computer operating environment according to one embodiment of the disclosure.

In the beginning of the process, after the terminal machine is activated, the terminal machine starts to operate through a network booting process (step S301). The network device of the terminal machine receives a network address from a server that is in charge of allocating network addresses in a template machine. The terminal machines are then communicated with each other. When the network booting process in each of the terminal machines is completed, an operating environment duplicate program corresponding to the deployment program operated in the template machine is executed in the terminal machine (step S303).

The operating environment duplicate program can be used to cover the various functional programs running in the terminal machine when the deployment is in operation. The operating environment duplicate program receives the metainfo from the template machine and the segments from the template machine or other terminal machines (step S305). The operating environment duplicate program also decodes the received segments and uses the corresponding checksums to verify the correctness thereof. The segments are then stored to the storage device of the terminal machine based on the indexes (step S307).

Afterwards, the segments are re-distributed to the other terminal machines in the network domain under the peer-to-peer data sharing protocol by the operating environment duplicate program executed in the terminal machine (step S309). With the BitTorrent data transmission protocol as an example, when the terminal machine encodes the received segments and distributes the encoded segments with the corresponding checksums, the terminal machine connects to the deployment tracker according to the network address of the deployment tracker recorded in the data of the segments. The terminal machine can obtain the information of the segments that is required to acquire and also provide the information of the segments that are already received. Therefore, the deployment tracker can acquire the information of the segments that is already received by each of the terminal machines. The information acquired by the deployment tracker can be used to coordinate the operation of the entire deployment system. Since the deployment information discloses which segments are already deployed to the terminal machines and which segments are distributed to a few of the terminal machines, the system can notify each of the terminal machines how to acquire the information of the segments, and further balance the paths to transmit the data according to the network bandwidth until the deployment among the terminal machines is completed. In step S311, when the terminal machine completes the deployment of operating environment, a message indicating that the deployment has been completed is sent to the deployment tracker. In one embodiment of the disclosure, the peer-to-peer data sharing protocol makes the deployment system to have scalability so as to add a new terminal machine to the network domain. The performance for deployment will not be greatly reduced if any new terminal machine is added, and the system is able to maintain an acceptable level of deployment performance.

Figure 4:
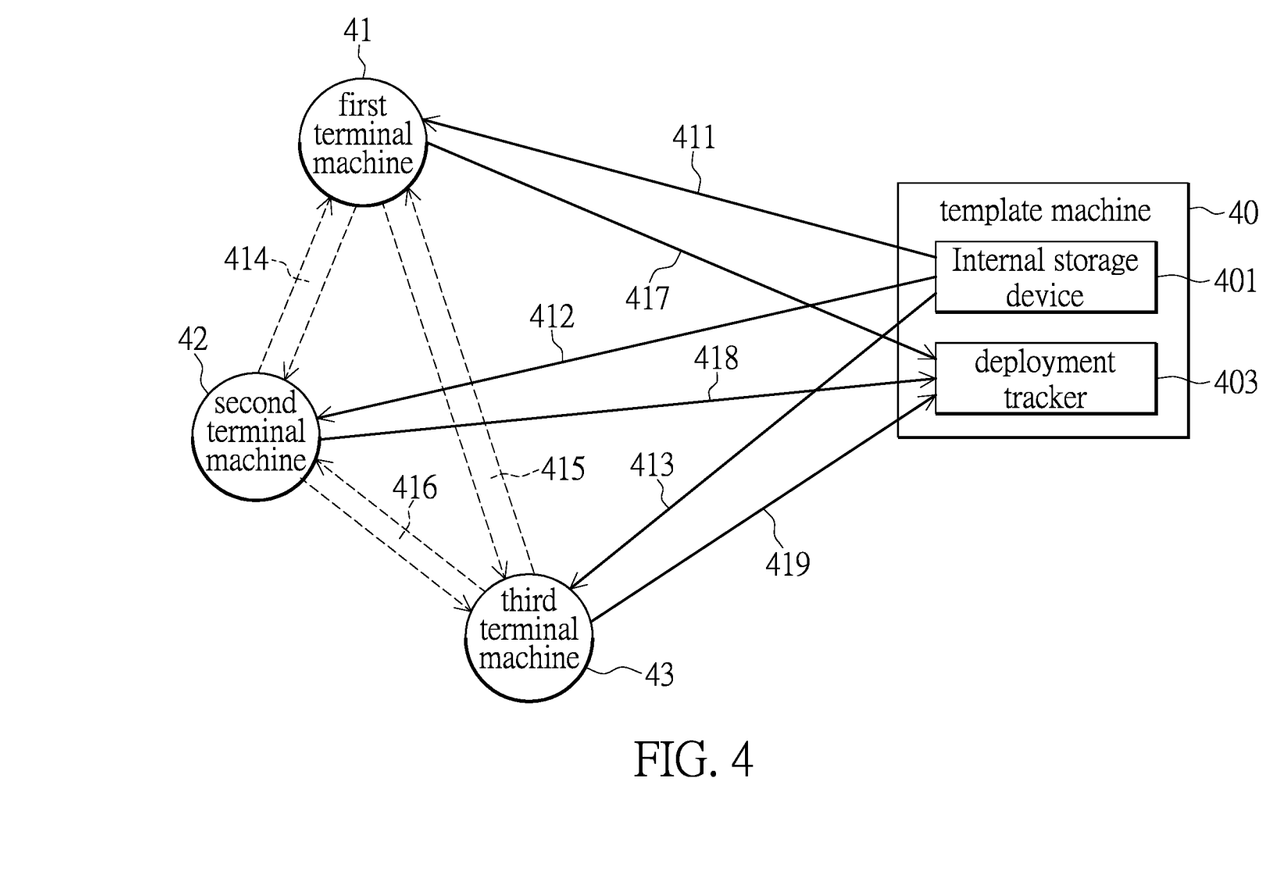
FIG. 4 is a schematic diagram depicting an operating environment to be deployed between the template machine and the terminal machines in one embodiment of the disclosure.

Reference is made to FIG. 4, which is a schematic diagram depicting a deployment process operating between the template machine and the terminal machines in one embodiment of the disclosure. The diagram shows one of the network topologies adapted to the method for deploying a computer operating environment.

A plurality of terminal machines, such as a first terminal machine 41, a second terminal machine 42 and a third terminal machine 43, are included in the network domain. A template machine 40 is also included in the network domain. The template machine 40 can be one of the terminal machines in the network domain. The template machine 40 includes an internal storage device 401. The template machine 40 operates a deployment tracker 403 that is used to manage operations of deployment. A deployment program is executed in the terminal machine 40 when it is initiated. The deployment program scans the data in the internal storage device 401, especially the data regarding the used file system blocks therein. The used blocks are such as the data in the operating environment. The used blocks are segmented into segments, and encoded. Indexes and checksums with respect to the segments are created and encoded. The template machine 40 acts as a seeder having the entire segments. The segments are configured to be distributed to the terminal machines 41, 42 and 43 via the paths used to transmit segments 411, 412 and 413.

The terminal machines 41, 42 and 43 are firstly booted over network. The terminal machines 41, 42 and 43 acquire information about deployment from the deployment tracker 403. The information includes an address of the deployment tracker 403. The terminal machines 41, 42 and 43 can therefore obtain the segments according to the information of deployment, and also send the information about the received segments to the deployment tracker 403. In the terminal machines 41, 42 and 43, the received segments are decoded and verified according to the checksums. After the correctness of the received segments with the checksums is verified, the segments are written to the storage device respective to any of the terminal machines 41, 42 and 43, and the verified segments with their checksums are re-distributed to the other terminal machines in the network domain over the paths for distributing segments 414, 415 and 416 according to the information received from the deployment tracker 403. In the diagram, the first terminal machine 41, the second terminal machine 42 and the third terminal machine 43 send deployment information 417, 418 and 419 to the deployment tracker 403.

The terminal machines 41, 42 and 43 receive the segments from the template machine 40 or the other terminal machines through the peer-to-peer data sharing protocol. The segments are then decoded and verified with the checksums. When installation of the operating environment to the terminal machine is confirmed according to the indexes of the segments, the deployment is completed.

Figure 5:
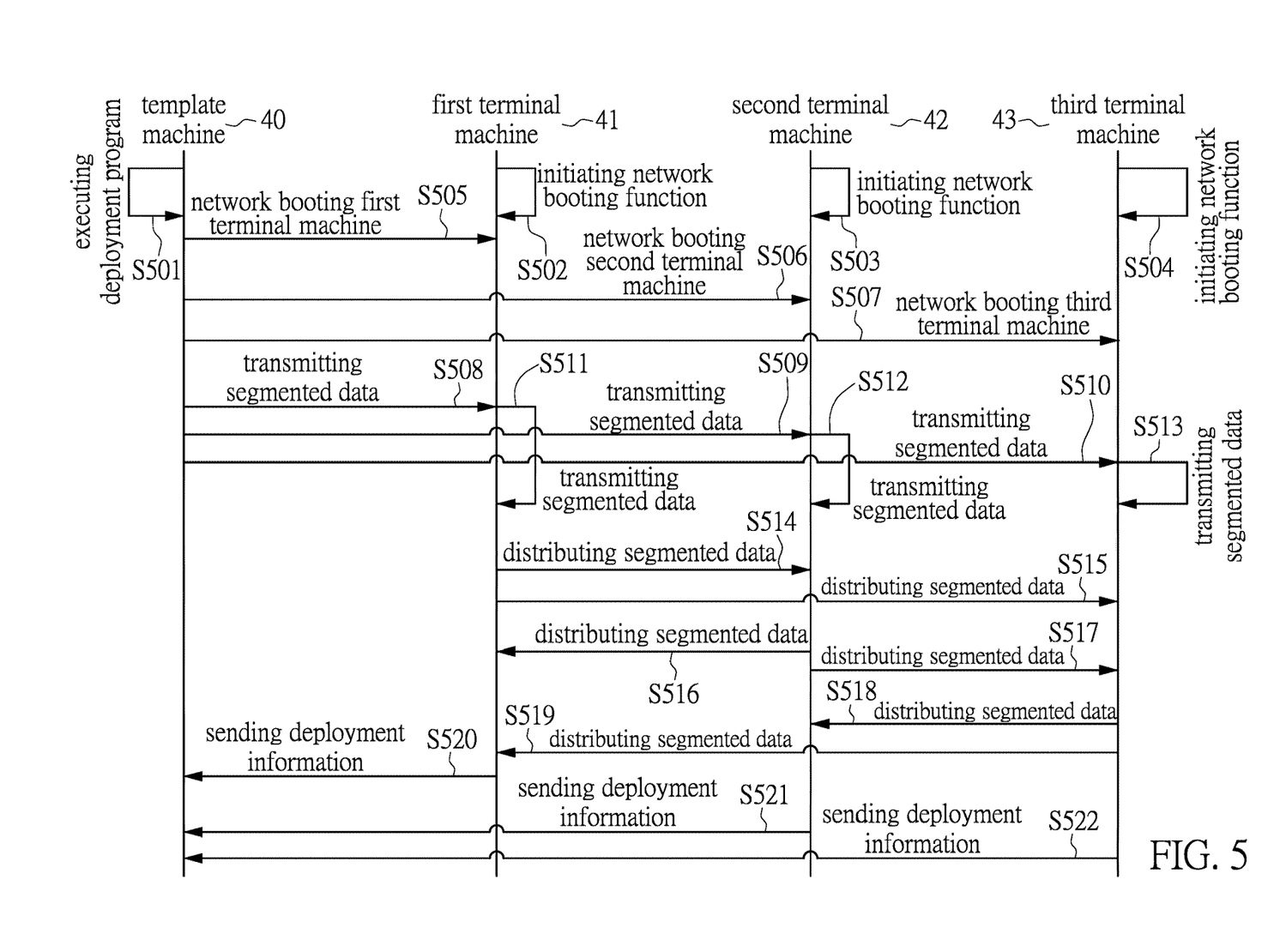
FIG. 5 shows a flow chart describing a method for deploying a computer operating environment performed among multiple computer devices in a network domain in one embodiment of the disclosure.

FIG. 5 next shows a flow chart describing the deployment process among the template machine 40 and multiple devices such as the first terminal machine 41, the second terminal machine 42 and the third terminal machine 43 according to one embodiment of the present disclosure.

A deployment program is executed in the template machine 40 after initiating the template machine 40 (step S501). A deployment tracker may be operated in the template machine 40 for tracking the deployment progress of every terminal machine in the network domain. The template machine 40 may operate a server for serving the terminal machines. For example, the template machine 40 runs a DHCP server for allocating IP addresses to the terminal machines. The first terminal machine 41, the second terminal machine 42 and the third terminal machine 43 each activate their network booting function (steps S502, S503 and S504). When the terminal machine boots up, the terminal machine receives an IP address and related configuration from the template machine 40. Further, the requisite information for network booting is also obtained from the template machine 40 (steps S505, S506 and S507).

In the method for deploying a computer operating environment, the data of the operating environment in the template machine 40 are segmented into segments. The corresponding checksums are also created. The segments with the checksums are then distributed to the first terminal machine 41, the second terminal machine 42 and the third terminal machine 43 (steps S508, S509 and S510). Each of the terminal machines 41, 42 and 43 processes the received segments, respectively (steps S511, S512 and S513). For example, the program running in the terminal machine decodes the received segments and retrieves the checksums for verifying the correctness of the segments. These segments are written to the storage device after they are checked, and these segments can be encoded and re-distributed to the network. The steps S514 to S519 indicate that the terminal machines 41, 42 and 43 obtain the information of segments from a deployment tracker when establishing the connection there-between. Therefore, the segments are distributed among the terminal machines 41, 42 and 43 through the peer-to-peer data sharing protocol. Lastly, the first terminal machine 41 completes the deployment after receiving the entire segments, and sends deployment information to the template machine 40 (step S520). The second terminal machine 42 completes the deployment after receiving the entire segments, and sends the deployment information to the template machine 40 (step S521). The third terminal machine 43 also completes the deployment after receiving the entire segments, and sends the deployment information showing the deployment is completed to the template machine 40 (e.g., the deployment tracker) (step S522).

Figure 6:
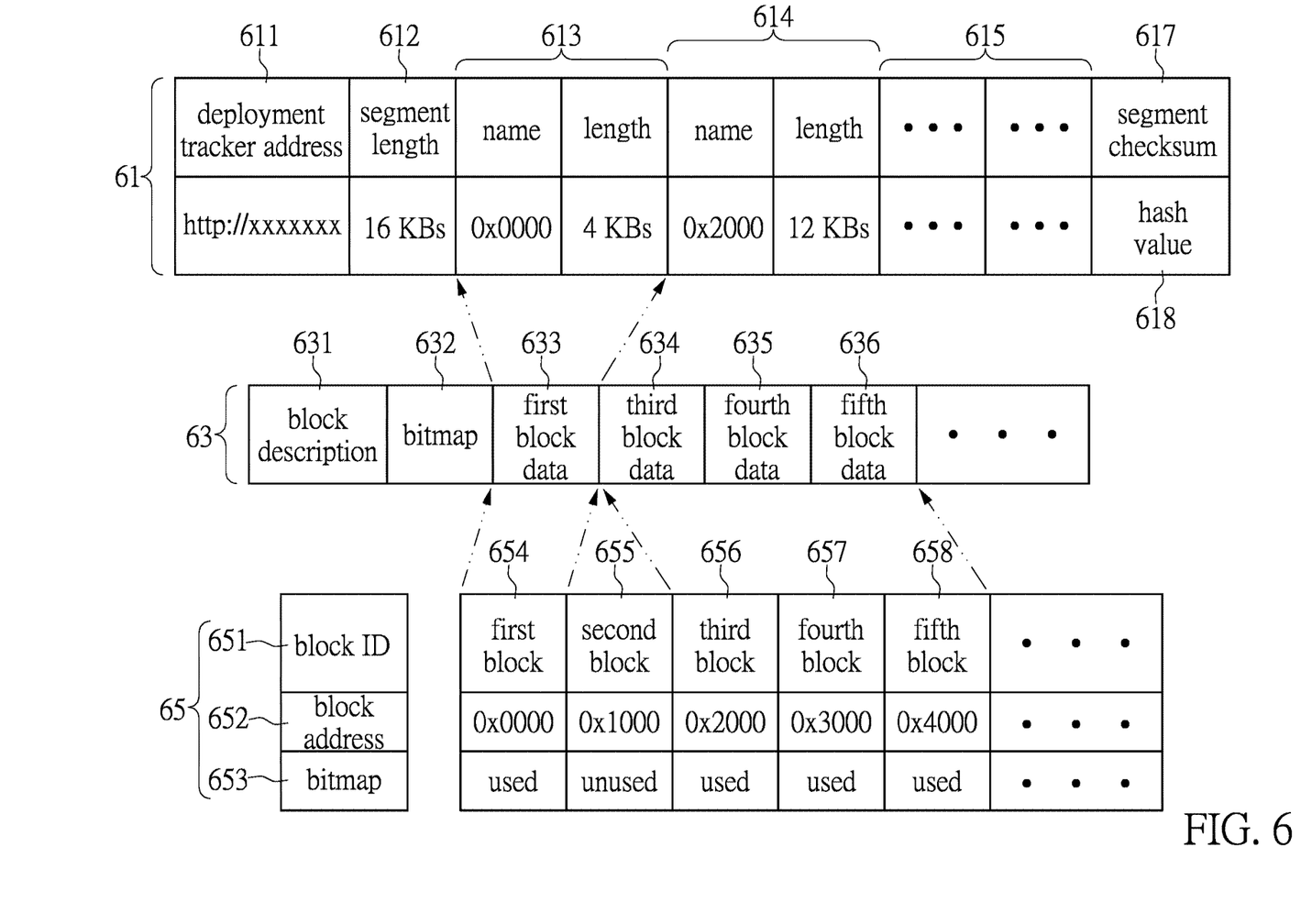
FIG. 6 is a schematic diagram depicting a data structure applied to the method for deploying a computer operating environment in one embodiment of the disclosure.

FIG. 6 is a schematic diagram exemplarily depicting the data structure of the segments and file system in the internal storage device of the template machine. The data structure operated in the template machine is such as a torrent structure 61, a block mapping structure 63 and a partition structure 65 that are used to describe the data structure formatted by a specific peer-to-peer data sharing protocol.

The data being distributed to the terminal machines can be bit-by-bit stored in a specific partition. The data may be the physical data of the file system in the internal storage device of the template machine. The partition structure 65 can be stored to the memory in blocks. Every block is depicted by a block ID 651, an offset address 652 and a bitmap 653. In the present example, the blocks in the partition includes a first block (654) with block address "0x0000" that is a used block; a second block (655) with block address "0x1000" that is an unused block; a third block (656) with block address "0x2000" that is a used block; a fourth block (657) with block address "0x3000" that is a used block; and a fifth block (658) with block address "0x4000" that is a used block.

The data are required to be pre-processed before the data of the file system of the internal storage device are distributed through the peer-to-peer data sharing protocol. The pre-processed process is such as scanning, encoding and segmenting performed by the deployment program. After that, the block mapping structure 63 is formed. The block mapping structure 63 includes block description 631, bitmap 632 and original block data including used blocks. The unused blocks can be excluded. The used blocks are such as a first block data 633, a third block data 634, a fourth block data 635, and a fifth block data 636. The block mapping structure 63 indicates the mapping of the torrent structure 61 that is able to be distributed to the other terminal machines.

The torrent structure 61 is configured to record IP address of torrent tracker 611, length of segment 612 (16 KBs) and information of the segment. The current example shows a first data 613 that records name (0x0000) and its length (4 KBs) that can be mapped to an address of physical data in the partition structure 65. Further information recorded in the torrent structure 61 includes a second data 614 including name (0x2000) and length (12 KBs) and other data 615. Lastly, the torrent structure 61 records the segment checksum 617 and a hash value 618 specified to the segment.

Thus, the above-mentioned torrent structure 61, block mapping structure 63 and partition structure 65 are configured to be distributed among the template machine of the deployment system and the plurality of terminal machines.

In conclusion, according to the embodiments depicting the method for deploying the computer operating environment and the system, the system distributes the segments via a peer-to-peer data sharing technology so as to achieve the purpose of massive deployment. It should be noted that the data distributed to the terminal machines are not an image but the encoded segments in compliance with a specific peer-to-peer data sharing protocol. Further, with the BitTorrent data transmission protocol as an example, the more terminal machines join the deployment plan, the more overall resources can be shared. Therefore, the massive deployment can be operated more efficiently.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for deploying a computer operating environment, comprising:
providing a template machine that executes a deployment program used to scan file system blocks of an internal storage device of the template machine, segment and encode data of operating environment in the file system blocks of the internal storage device, so as to form multiple segments and create an index and a checksum for each of the segments;
generating metainfo required by a peer-to-peer data sharing protocol with respect to the index and the checksum of each of the segments;
distributing the multiple segments to multiple terminal machines in a network domain by the deployment program in compliance with the peer-to-peer data sharing protocol; and
in each of the terminal machines, performing an operating environment duplicate program for receiving the segments, decoding, and verifying each of the segments by the checksum; and re-distributing the verified segments to other terminal machines via the peer-to-peer data sharing protocol;
wherein the terminal machine receives multiple segments from the template machine and other terminal machines in compliance with the peer-to-peer data sharing protocol; the segments are decoded and verified; the operating environment is installed completely in a storage device of the terminal machine according to the index of each of the segments; and in the end, the operating environment is completely deployed to the terminal machine.

2. The method according to claim 1, wherein the peer-to-peer data sharing protocol is a BitTorrent data transmission protocol that is implemented among the terminal machines in the network domain.

3. The method according to claim 1, wherein the deployment program is installed in a specific storage device that has installed an operating system and a server program, the operating system in the specific storage device initiates the template machine so as to operate a DHCP (dynamic host configuration protocol) server for serving the terminal machine to be operated over network.

4. The method according to claim 3, wherein the specific storage device that installs the deployment program is an external storage device.

5. The method according to claim 3, wherein, when the template machine is initiated, a deployment tracker is operated in the template machine for tracking a deployment progress of each of the terminal machines in the network domain.

6. The method according to claim 5, wherein, when each of the terminal machines has been deployed with the computer operating environment, a message indicating that the deployment has been completed is sent to the deployment tracker.

7. The method according to claim 6, wherein the peer-to-peer data sharing protocol is a BitTorrent data transmission protocol that is operated among the terminal machines in the network domain.

8. The method according to claim 1, wherein, when scanning the file system of the internal storage device of the template machine, the file system blocks of the internal storage device are segmented and encoded automatically, and segment indexes and checksums with respect to the file system blocks are also created automatically; wherein the metainfo is formed, and a size of the metainfo is suitable to be temporarily stored in a memory of the template machine.

9. The method according to claim 8, wherein the peer-to-peer data sharing protocol is a BitTorrent data transmission protocol that is operated among terminal machines in the network domain.

10. A deployment system, comprising:
a plurality of terminal machines being located in a network domain having a template machine;
wherein, in the template machine, a deployment program is executed for scanning a file system of an internal storage device of the template machine; an operating environment in the file system of the internal storage device is segmented and encoded so as to form multiple segments; an index and a segment checksum for each of the segments are generated; a metainfo in compliance with a peer-to-peer data sharing protocol is calculated according to the index and the segment checksum for each of the segments; the multiple segments are then distributed to the multiple terminal machines via the peer-to-peer data sharing protocol;
wherein, in each of the terminal machines, an operating environment duplicate program is executed to receive the segments, decode the segments and use the checksums thereof to verify the segments; the verified segments are distributed to other terminal machines in the network domain via the peer-to-peer data sharing protocol; each of the terminal machines receives the segments from the template machine and other terminal machines via the peer-to-peer data sharing protocol; after decoding and verification are completed, the segments are written to a storage device of the terminal machine, and in the end, the operating environment is successfully installed in the terminal machine according to the indexes of the segments, and the deployment of the operating environment to the terminal machines is completed.

11. The system according to claim 10, wherein the peer-to-peer data sharing protocol is a BitTorrent data transmission protocol that is operated among the terminal machines in the network domain.

12. The system according to claim 10, wherein the deployment program is installed in a specific storage device that has installed an operating system and a server program, and the operating system operated in the specific storage device initiates the template machine so as to operate a DHCP (dynamic host configuration protocol) server for serving the terminal machine to be operated over network.

13. The system according to claim 12, wherein the specific storage device that installs the deployment program is an external storage device.

14. The system according to claim 13, wherein one or more steps have been written in the external storage device for the template machine to perform automatically when the template machine boots up, so as to implement a deployment host that allows the multiple terminal machines to be booted via network and receive commands provided by the template machine automatically.

15. The system according to claim 12, wherein, when the template machine is initiated, a deployment tracker is operated in the template machine for tracking a deployment progress of each of the terminal machines in the network domain; wherein, when the terminal machine has been deployed with the computer operating environment, a message indicating that the deployment has been completed is sent to the deployment tracker.

16. The system according to claim 15, wherein the peer-to-peer data sharing protocol is a BitTorrent data transmission protocol that is operated among the terminal machines in the network domain.

* * * * *